Ohkubo et al.

United States Patent [19]

[11] Patent Number: 6,083,598
[45] Date of Patent: Jul. 4, 2000

[54] INFORMATION RECORDING MEDIUM, METHOD FOR MANUFACTURING THE MEDIUM, AND APPARATUS FOR MANUFACTURING THE MEDIUM

[75] Inventors: Yoshiyuki Ohkubo, Kawasaki, Japan; Kan Nishizaka, Ankara, Turkey

[73] Assignee: Kabushiki Kaisha Toshiba, Kawasaki, Japan

[21] Appl. No.: 09/154,154

[22] Filed: Sep. 16, 1998

Related U.S. Application Data

[62] Division of application No. 08/769,402, Dec. 19, 1996, Pat. No. 5,858,498.

[30] Foreign Application Priority Data

Dec. 20, 1995 [JP] Japan ................................ 7-331994

[51] Int. Cl.$^7$ .................................................... B32B 3/00
[52] U.S. Cl. ................ 428/64.1; 428/64.4; 428/64.5; 428/64.7; 428/65.2; 428/457; 428/913; 430/270.12; 430/495.1; 430/945; 369/283; 369/288
[58] Field of Search ................... 428/64.1, 64.2, 428/64.4, 64.5, 64.7, 65.2, 457, 913; 430/270.12, 495.1, 945; 369/275.4, 283, 288

[56] References Cited

U.S. PATENT DOCUMENTS

| 4,450,553 | 5/1984 | Holster et al. . |
| 4,740,947 | 4/1988 | Ohta ........................................ 369/286 |
| 4,990,208 | 2/1991 | Kano . |
| 5,202,875 | 4/1993 | Rosen et al. . |
| 5,555,567 | 9/1996 | Imaino ..................................... 369/109 |
| 5,627,816 | 5/1997 | Ito ........................................ 369/275.1 |
| 5,681,634 | 10/1997 | Miyamoto ............................... 428/64.6 |
| 5,858,496 | 1/1999 | Ohkubo ................................... 428/64.1 |

FOREIGN PATENT DOCUMENTS

| 0 277 734 | 8/1988 | European Pat. Off. . |
| 61-217944 | 9/1986 | Japan . |
| 62-214539 | 9/1987 | Japan . |
| 62-214540 | 9/1987 | Japan . |
| 63-094447 | 4/1988 | Japan . |
| 63-195842 | 8/1988 | Japan . |
| 03256247 | 3/1990 | Japan . |
| 04042445 | 2/1992 | Japan . |

*Primary Examiner*—Elizabeth Evans
*Attorney, Agent, or Firm*—Pillsbury Madison & Sutro LLP

[57] ABSTRACT

In an optical disk obtained by pasting two substrates, air bubbles and the like are removed from an adhesive layer between the substrates pasted together, and the thickness irregularity of the adhesive layer is suppressed to an allowable value or less. A spacer having a predetermined thickness is concentrically placed on a substrate. An adhesive is applied onto a surface of the substrate on which the spacer is placed. Another substrate is placed on the surface of the substrate on which the adhesive is applied. The substrates are rotated about the spacer at a high speed. The excessive adhesive sandwiched between the substrates is expelled, together with air bubbles and the like, by using the centrifugal force produced by the rotation. With this process, an adhesive layer having a thickness determined by the thickness of the spacer is left between the two substrates.

7 Claims, 11 Drawing Sheets

INFORMATION RECORDING MEDIUM, METHOD FOR MANUFACTURING THE MEDIUM, AND APPARATUS FOR MANUFACTURING THE MEDIUM

This is a division of application Ser. No. 08/769,402, filed Dec. 19, 1996, now U.S. Pat. No. 5,858,498 issued Jan. 12, 1999.

BACKGROUND OF THE INVENTION

The present invention relates to a method of manufacturing an information recording medium having a structure constituted by two disk substrates pasted together, an apparatus for manufacturing the medium, and a multi-substrate information recording medium obtained by the manufacturing method and, more particularly, to improvements in a bonding method and arrangement for a two-substrate double-layered optical disk designed such that pieces of information on two information recording layers are read from one surface of the optical disk.

Small-diameter optical disks (diameters: about five inches/120 mm to about 3.5 inches/80 mm) on which large-volume data, e.g., various types of video and speech data, can be recorded as digital data have recently been developed. According to an optical disk of this type, one or more information recording layers are formed on at least one of two disk substrates to ensure a large information storage amount. These substrates must be accurately pasted together to thereby obtain a large-capacity disk having a predetermined thickness (1.2 mm).

Assume that two disk substrates respectively having information recording layers formed thereon are accurately pasted together with an adhesive to obtain a large-capacity optical disk. When pieces of information on the internal information recording layers are read from one of the two disk substrates, a read laser invariably reciprocates via the adhesive layer between the substrates. At this time, if dust or an air bubble enters the adhesive layer between the substrates, an error occurs when reading the information corresponding to the position of the dust or the air bubble.

If the adhesive layer between the substrates is uneven and has thickness irregularity, since the laser traveling path length varies at the portions of the adhesive layer at which its thickness changes, an error tends to occur when reading the information corresponding to a position where thickness irregularity occurs.

If air bubbles enter the adhesive layer between the substrates, the strength of this adhesive layer decreases. For this reason, the disk substrates pasted together may peel away from each other upon to the impact of falling or the like.

If only one of the two disk substrates has an information recording layer, and the other substrate does not have a similar information recording layer (or a dummy layer corresponding to the recording layer), the pasted surface may deteriorate with environmental changes. As a result, the two disk substrates pasted together may peel away from each other or become deformed.

Dust or air bubbles must be completely removed, and the thickness irregularity of the adhesive layer between the substrates must be minimized (e.g., within ±5 μm with respect to an adhesive layer thickness of 50 μm). It is, however, difficult to realize adhesive layers without air bubbles/thickness irregularity for mass-produced two-substrate optical disks with a high yield.

BRIEF SUMMARY OF THE INVENTION

It is the first object of the present invention to provide a method of manufacturing a multi-substrate information recording medium in which no dust or air bubbles are included in an adhesive layer, and the thickness irregularity of the adhesive layer is suppressed to an allowable value or less.

It is the second object of the present invention to provide an apparatus for manufacturing a multi-substrate information recording medium in which no dust or air bubbles are included in an adhesive layer, and the thickness irregularity of the adhesive layer is suppressed to an allowable value or less.

It is the third object of the present invention to provide a multi-substrate information recording medium which is manufactured by the method of the first object.

In order to achieve the first object, a manufacturing method of the present invention comprises the steps of:
(a) placing a spacer (60) having a predetermined thickness concentrically with respect to a first substrate (30) on which an information recording layer (10) is formed;
(b) supplying a predetermined amount of adhesive (220) onto a surface of said first substrate (30) on which said spacer (60) is placed;
(c) bringing a second substrate (40) into contact with the surface of said first substrate (30) to which said adhesive (220) is supplied; and
(d) rotating said first and second substrates (30, 40) about a position of said spacer (60) to expel said adhesive (220), sandwiched between said first and second substrates (30, 40), thereby obtaining an adhesive layer (50) between said first and second substrates (30, 40), said adhesive layer having a thickness regulated by a thickness of said spacer (60).

In the rotation step (d), the two substrates (30, 40) can be rotated at a high speed to completely expel dust and air bubbles from the space between the substrates, while the space between the two substrates which is regulated by the thickness (e.g., 50 μm) of the spacer (60) is kept.

During this high-speed rotating operation, when the adhesive (220) is expelled from the space between the two substrates, the inner pressure between the two substrates decreases, and forces based on the ambient pressure (atmospheric pressure in general) are uniformly exerted on the entire surfaces of the two substrates in a direction in which they are pressed against each other. At this time, the space between the two substrates does not decrease below the thickness (50 μm). As a result, the thickness of the adhesive layer (50) made of the adhesive (220) between the two substrates can be controlled within a predetermined range (e.g., 50±5 μm) regulated by the thickness of the spacer (60).

The relationship between the first and second substrates may be reversed if the two substrates have information recording layers. More specifically, the first substrate (30) may be brought into contact with the second substrate (40) through the spacer (60) and the adhesive (220) instead of bringing the second substrate (40) into contact with the first substrate (30) through the spacer (60) and the adhesive (220).

In order to achieve the second object, a manufacturing apparatus of the present invention comprises:
positioning/holding means (200, 202) for concentrically positioning and holding a first substrate (30) having a predetermined inner diameter, a spacer (60) having an inner diameter not less than the predetermined inner diameter and a predetermined thickness, and a second substrate (40) having the predetermined inner diameter, with an adhesive (220) being sandwiched between said first and second substrates (30, 40);

rotating means (210) for rotating the first substrate (30), said spacer (60), and said substrate (40), which are concentrically positioned and held by said positioning/holding means (200, 202), for a predetermined period of time, at a speed at which the adhesive (220) is expelled; and adhesive curing means (230) for curing a layer (50) of the adhesive (220) which is left between said first and second substrates (30, 40) to have a predetermined thickness regulated by the spacer (60) after the adhesive (220) is partly expelled by rotation of said rotating means (210).

The above two substrates (30, 40) can be rotated by means of the rotating means (210) at a high speed to completely expel dust and air bubbles from the space between the substrates, while the space between the two substrates which is regulated by the thickness (e.g., 50 μm) of the spacer (60) is kept.

During this high-speed rotating operation, when the adhesive (220) is expelled from the space between the two substrates, the inner pressure between the two substrates decreases, and forces based on the ambient pressure are uniformly exerted on the entire surfaces of the two substrates in a direction in which they are pressed against each other. At this time, the space between the two substrates does not decrease below the thickness (50 μm). As a result, the thickness of the adhesive layer (50) made of the adhesive (220) between the two substrates can be controlled within a predetermined range (e.g., 50±5 μm) regulated by the thickness of the spacer (60).

The following inconveniences are posed in the manufacturing method and apparatus of the present invention without the spacer (60).

In the absence of the spacer (60), the thickness between the two substrates (30, 40) to be pasted together depends on the viscosity of the adhesive (220) before curing and the rotational speed (the number of revolutions per unit time) of the two substrates (30, 40). In this case, in order to set the thickness of the adhesive layer after a pasting process to a predetermined value (e.g., about 50 μm), the rotational speed must be suppressed to a speed corresponding to the desired adhesive layer thickness (because an excessive rotational speed makes the adhesive layer thickness too small). Such a limitation on the rotational speed increases the possibility that the two substrates (30, 40) cannot be rotated at a speed high enough to completely expel air bubbles left in the adhesive layer (50) between the two substrates. As a result, the manufacturing yield of multi-substrate disks without air bubbles decreases. With the use of the spacer (60) as in the present invention, even if the two substrates (30, 40) to be pasted together are rotated at a sufficiently high speed, the adhesive layer between the two substrates does not become too thin. That is, since no upper limit is imposed on the rotational speed, air bubbles, dust, and the like left in the adhesive layer (50) between the two substrates (30, 40) can be completely expelled by rotating the substrates at a sufficiently high speed.

In order to achieve the third object, a multi-substrate information medium of the present invention comprises:

a first substrate (30) in the form of a disk with a hole, on which a first information recording layer (10) is formed, said first substrate having a predetermined outer diameter, a predetermined inner diameter, and a predetermined thickness;

a second substrate (40) in the form of a disk with a hole, on which a second information recording layer (20) is formed, said second substrate having the predetermined outer diameter, the predetermined inner diameter, and a predetermined thickness;

a spacer (60) having a predetermined outer diameter, a predetermined inner diameter, and a predetermined thickness and concentrically sandwiched between said first and second substrates (30, 40); and an adhesive layer (50) which is present between said first and second substrates (30, 40) except for a position of said spacer (60), and has a predetermined thickness regulated by said spacer (60).

When information on the internal information recording layers (10, 20) is to be read from one surface side of one of the two substrates (30, 40), a read laser reciprocates via the adhesive layer (50) between the two substrates. In this case, if the adhesive layer (50) between the two substrates has thickness irregularity, air bubbles, and the like, since the laser traveling path length varies at the portions of the adhesive layer at which its thickness changes, errors tend to occur when pieces of information corresponding to positions where thickness irregularity, air bubble formation, and the like occur are read.

According to the multi-substrate information recording medium of the present invention, however, with the use of the spacer (60), the thickness of the adhesive layer (50) between the first and second substrates (30, 40) is almost uniformly controlled to the thickness (about 50±5 μm) regulated by the spacer (60) even if the substrates are rotated at a speed high enough to completely expel the air bubbles. Therefore, the rate of occurrence of read errors due to the thickness irregularity of the adhesive layer (50), air bubbles included therein, and the like can be suppressed to a level at which no practical problems are posed.

In addition, owing to the above spacer (60), a high-speed rotating process of completely removing air bubbles from the adhesive layer (50) can be performed while the thickness of the adhesive layer is controlled within a predetermined range, thereby preventing a decrease in the strength of the adhesive layer due to air bubbles left in the adhesive layer. This prevents the disk substrates pasted together from peeling from each other due to the impact of falling or the like.

Further, the multi-substrate information recording medium of the present invention which is associated with the third object comprises:

a first substrate (30) in the form of a disk with a hole, on which a first information recording layer (10) is formed, said first substrate (30) having a predetermined outer diameter, a predetermined inner diameter, and a predetermined thickness;

a second substrate (40) in the form of a disk with a hole, on which a dummy layer (20d) is formed, said second substrate (40) having the predetermined outer diameter, the predetermined inner diameter, and a predetermined thickness;

a spacer (60) having a specific outer diameter, a specific inner diameter, and a predetermined thickness, and concentrically sandwiched between said first and second substrates (30, 40); and an adhesive layer (50) which is present between said first and second substrates (30, 40) except for a position of said spacer (60), and has a predetermined thickness regulated by said spacer (60).

As the above multi-substrate information recording medium, a medium having an information recording layer (10) on only one (30) of the two disk-like substrates (30, 40) is mainly assumed. The non-recorded dummy layer (20d) corresponding the information recording layer (10) is formed on the other (40) of the substrates to be pasted together. When similar layers (10, 20) are respectively formed on one substrate (30) and the other substrate (40) in this manner, and the substrates are pasted together with the layers opposing each other, the following effects can be obtained. Since physical distortions of the two substrates with environmental changes or with changes in quality over time occur symmetrically in almost the same amount, the distortions are canceled out by the pasting process. For this reason, peeling or warping of the substrates pasted together does not easily occur, and hence a multi-substrate information recording medium which is physically stable with respect to environmental changes or changes in quality over time can be obtained.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, servo to explain the principles of the invention.

DETAILED DESCRIPTION OF THE INVENTION

Figure 1:
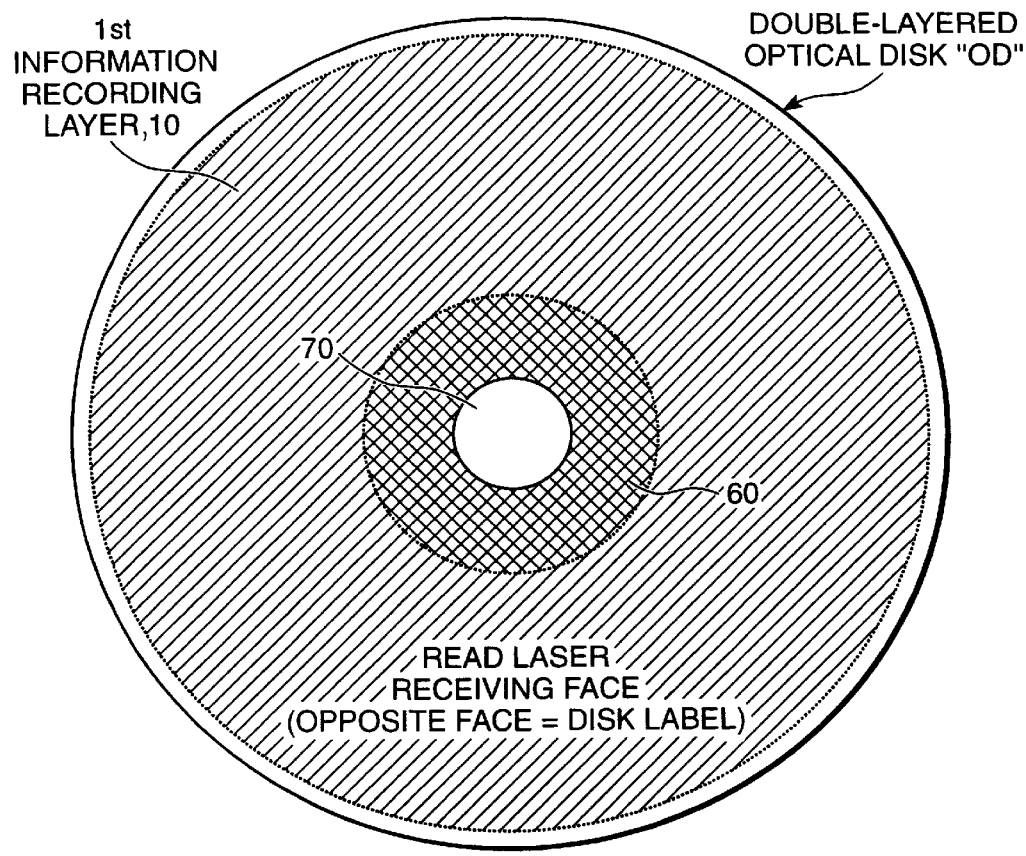
FIG. 1 is a plan view showing a double-layered optical disk according to an embodiment of the present invention when viewed from the read laser receiving face side.

A method of manufacturing a multi-substrate information medium, an apparatus for manufacturing the multi-substrate information recording medium, and the multi-substrate information recording medium according to an embodiment of the present invention will be described below with reference to the accompanying drawings. In order to avoid repetitive descriptions, the same reference numerals denote the same parts throughout several drawings.

FIG. 1 is a plan view showing a double-layered optical disk OD used as a multi-substrate information recording medium of the present invention, when viewed from the read laser receiving face side. Optical disk OD is constituted by two polycarbonate substrates pasted together, each of which has an outer diameter of 120 mm, center hole 70 having an inner diameter of 15 mm, and a thickness of 0.6 mm. Optical disk OD is 1.2 mm thick. A doughnut-like information recording layer is formed on each of the substrates (FIG. 1 shows only layer 10 on one substrate). Each of these doughnut-like information recording layers has an inner diameter of about 45 mm and a maximum outer diameter of about 117 mm. Polymer film spacer 60 having, for example, an inner diameter of 15 to 16 mm, an outer diameter of 20 to 21 mm, and a thickness of about 50 $\mu$m is sandwiched between the two substrates to be coaxial with center hole 70 of optical disk OD having this arrangement.

As a polymer film used for spacer 60, a polycarbonate film, a polyethylene terephthalate film, a polyimide film, or the like can be used, when no information is printed on the surface of the film of spacer 60. When label information is to be printed on spacer 60, a polycarbonate film or the like can be suitably used. Note that, when such information is printed on the spacer, the substantial thickness of the spacer after printing needs to be controlled to a desired thickness (e.g., 50 $\mu$m).

Figure 2:
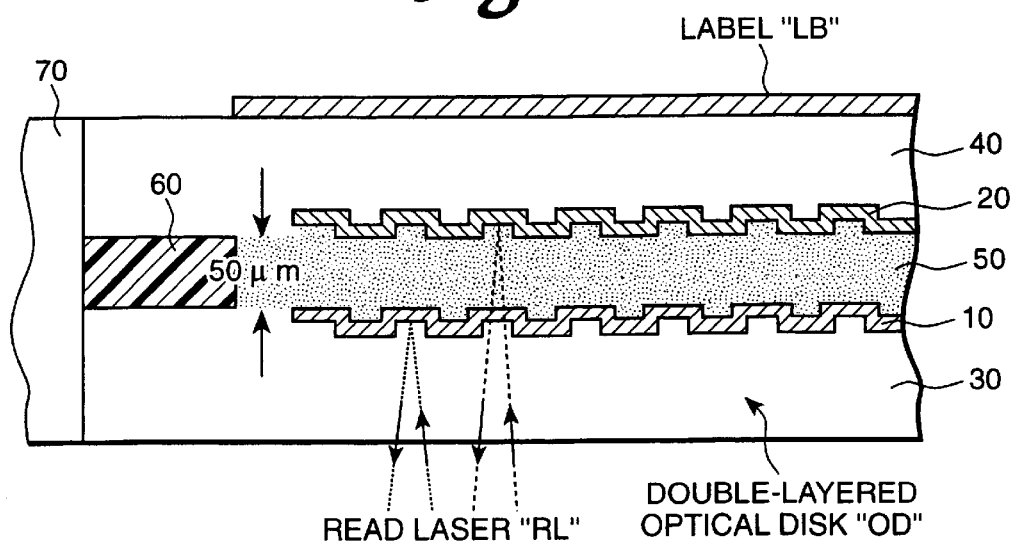
FIG. 2 is a partial deformed sectional view of the double-layered optical disk in FIG. 1.

FIG. 2 is a partial enlarged deformed sectional view of double-layered optical disk OD in FIG. 1. As shown in FIG. 2, disk OD constitutes a by polycarbonate substrate 30 for holding a first information recording layer, thin metal film (the first information recording layer having a thickness of 11 to 14 nm, e.g., about 13 nm) 10 on which first information is recorded, adhesive layer 50 which is transparent to read laser RL, thin aluminum-molybdenum alloy film (a second information recording layer having a thickness of 40 nm or more, e.g., about 100 nm) 20 on which second information is recorded, and polycarbonate substrate 40 for holding the second information recording layer. They are stacked in the order named when viewed from the surface on which read laser RL is incident. Label LB on which information (visual pattern information such as characters, pictures, or graphic patterns) associated with the recorded information (the above first and second information) is printed is bonded on substrate 40 on the opposite side to read laser receiving face 30, as needed.

Spacer 60 concentrically sandwiched between substrates 30 and 40 at the position of center hole 70 is 50 μm thick. Adhesive layer 50 sandwiched between substrates 30 and 40 at the same level as that of spacer 60 has almost the same thickness (about 50±5 μm) as that of spacer 60, i.e., 50 μm. The thickness of adhesive layer 50 may be increased while the film thickness of spacer 60 is increased accordingly.

If the thickness of thin metal film 10, which is used to form the first information recording layer, is selected between 11 nm and 14 nm (preferably about 13 nm), reflected read lasers having almost the same intensity can be obtained from both first and second information recording layers 10 and 20.

Note that first information recording layer 10 can be made of a material (a gold alloy, copper, silver, brass, a copper-zinc alloy, a copper-aluminum alloy, or the like) exhibiting almost the same reflectance and transmittance with respect 650 nm (or 635 nm) read laser RL as those of the thin metal film.

If the thickness of thin aluminum-molybdenum alloy film 20, which is used to form the second information recording layer, is selected to be 40 nm or more, the laser reflectance of film 20 can be set to a practically sufficient value (80% or more). In this embodiment, the set thickness of second information recording layer 20 is selected to be about 100 nm.

Second information recording layer 20 can be made of aluminum alone. However, degradation in the reflectance of thin film 20 serving as the second information recording layer over time (environmental reliability) can be greatly suppressed (improved) by using an alloy of aluminum and a refractory metal such as molybdenum, tantalum, cobalt, chromium, titanium, or platinum.

Molybdenum has a function of improving the oxidation resistance of second information recording layer 20, but needs to be used in a proper content range. The practical content range of molybdenum is 1 at % to 20 at %. The content of thin molybdenum to aluminum/molybdenum alloy film 20 is preferably 1 at % to 20 at %. In this embodiment, the content of molybdenum is set to 20 at %. When this content exceeds 20 at %, the laser reflectance of second information recording layer 20 decreases even if the thickness of thin film 20 is ensured to be 40 nm or more.

The wavelength of read laser RL may be 650 nm as described above or 635 nm, or may be shorter. If, however, the wavelength changes, the optimal film thickness of spacer 60 may change (the optimal film thickness may change depending on the physical properties of adhesive layer 50). In practice, the optimal film thickness is empirically determined by using a plurality of samples after the laser wavelength to be actually used, the material for adhesive layer 50, and the material for substrates 30 and 40 are determined. For example, the optimal film thickness is determined such that the C/N (carrier-to-noise) ratios of read signals from both recording layers 10 and 20 become a desired value or more, and sufficient bonding strength of substrates 30 and 40 is ensured.

Figure 3:
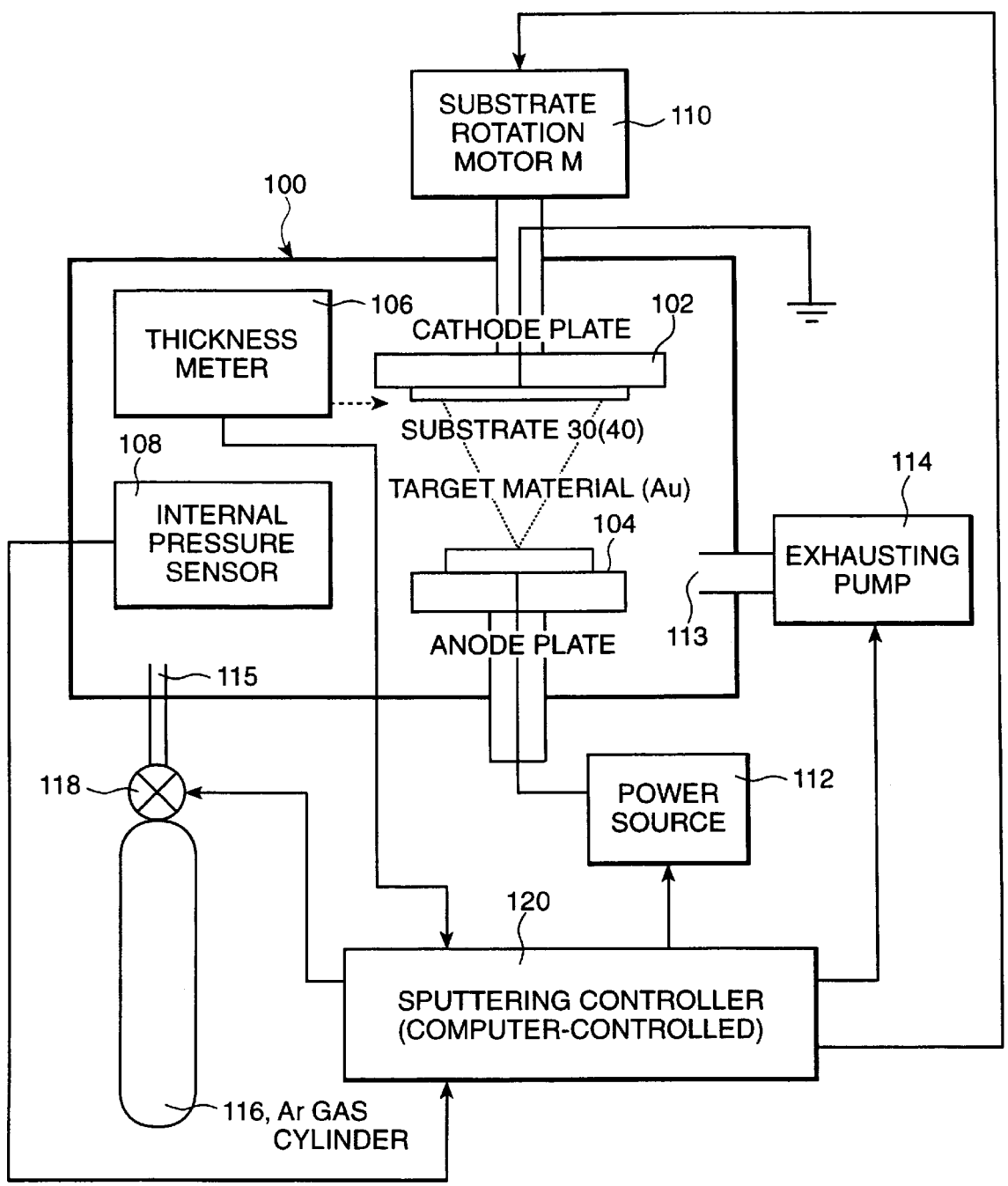
FIG. 3 is a block diagram showing a sputtering apparatus for forming first or second information recording layer 10 or 20 on the double-layered optical disk having the structure shown in FIG. 2.

For example, as the physical parameters of multi-substrate optical disk OD shown in FIGS. 1 and 2, the following values can be used:
[outer diameter]
   12-cm disk>120.00±0.30 mm
   8-cm disk>80.00±0.30 mm
[center hole 70]
   12-cm/8-cm disk>15.00+0.15 mm; 15.00−0.00 mm
[thickness after pasting]
   12-cm/8-cm disk>1.20+0.30 mm; 1.20−0.06 mm
[inner diameter of disk clamp area]
   12-cm/8-cm disk>maximum of 22.0 mm
[outer diameter of disk clamp area]
   12-cm/8-cm disk>minimum of 33.0 mm.
[thickness of disk clamp area]
   12-cm/8-cm disk>1.20+0.20 mm; 1.20−0.10 mm
[weight of disk after pasting]
   12-cm disk>13 g to 20 g
   8-cm disk>6 g to 9 g
[inertial moment of disk after pasting]
   12-cm disk>maximum of 0.040 g·m$^2$
   8-cm disk>maximum of 0.010 g·m$^2$
[dynamic balance of disk after pasting]
   12-cm disk>maximum of 0.010 g·m
   8-cm disk>maximum of 0.0045 g·m FIG. 3 shows the schematic arrangement of a sputtering apparatus for forming thin metal film (first information recording layer) 10 or thin aluminum-molybdenum alloy film (second information recording layer) 20 on substrate 30 or 40 of multi-substrate double-layered optical disk OD having the structure shown in FIG. 2.

Disk-like rotating base (cathode plate) 102 for holding polycarbonate substrate 30 (or 40) is placed in vacuum vessel 100 at a position near its top such that the rotating surface of the base is in a horizontal position. Rotating base 102 is rotated by motor 110 (need not always be rotated).

Anode plate 104 is placed in vacuum vessel 100 at a position near its bottom. A sputtering source is placed on anode plate 104 to oppose rotating base 102 placed above. This sputtering source is made of a material (gold) for laser reflecting layer 10 of optical disk OD or a material (aluminum, molybdenum, or the like) for laser reflecting layer 20.

Rotating base (cathode plate) 120 is grounded. When RF sputtering is to be performed, RF power source 112 is connected to anode plate 104 (DC power source 112 is connected to anode plate 104 in the case of DC sputtering). When sputtering is to be performed, an output voltage from power source 112 is applied between grounded cathode plate 102 and anode plate 104.

Vacuum vessel 100 is connected to exhausting pump 114 through gas outlet port 113. When sputtering is executed, a small amount (on the millimeter level) of argon gas (inert gas) is charged from Ar gas cylinder 116 as a sputtering gas into vacuum vessel 100, which has been evacuated by exhausting pump 114 to a sufficient level (μTorr level), through gas inlet port 115 and control valve 118. The amount of argon gas charged is checked by internal pressure sensor (vacuum gauge) 108 attached to vacuum vessel 100.

Substrate rotation motor 110, sputtering power source 112, exhausting pump 114, and control valve 118 are computer-controlled by the CPU incorporated in sputtering controller 120.

Monitor unit (thickness meter) 106 having a film thickness measuring function is p laced above the sputtering source (gold) placed on anode plate 104. The CPU of controller 120 monitors the amount of sputtering from the sputtering source to substrate 30 (40) through monitor unit 106. The CPU of sputtering controller 120 is programed to adjust RF power from power source 112 to anode plate 104 to make thin layer 10 (20) have a predetermined composition while monitoring the thin film sputtered onto substrate 30 (40).

Figure 4:
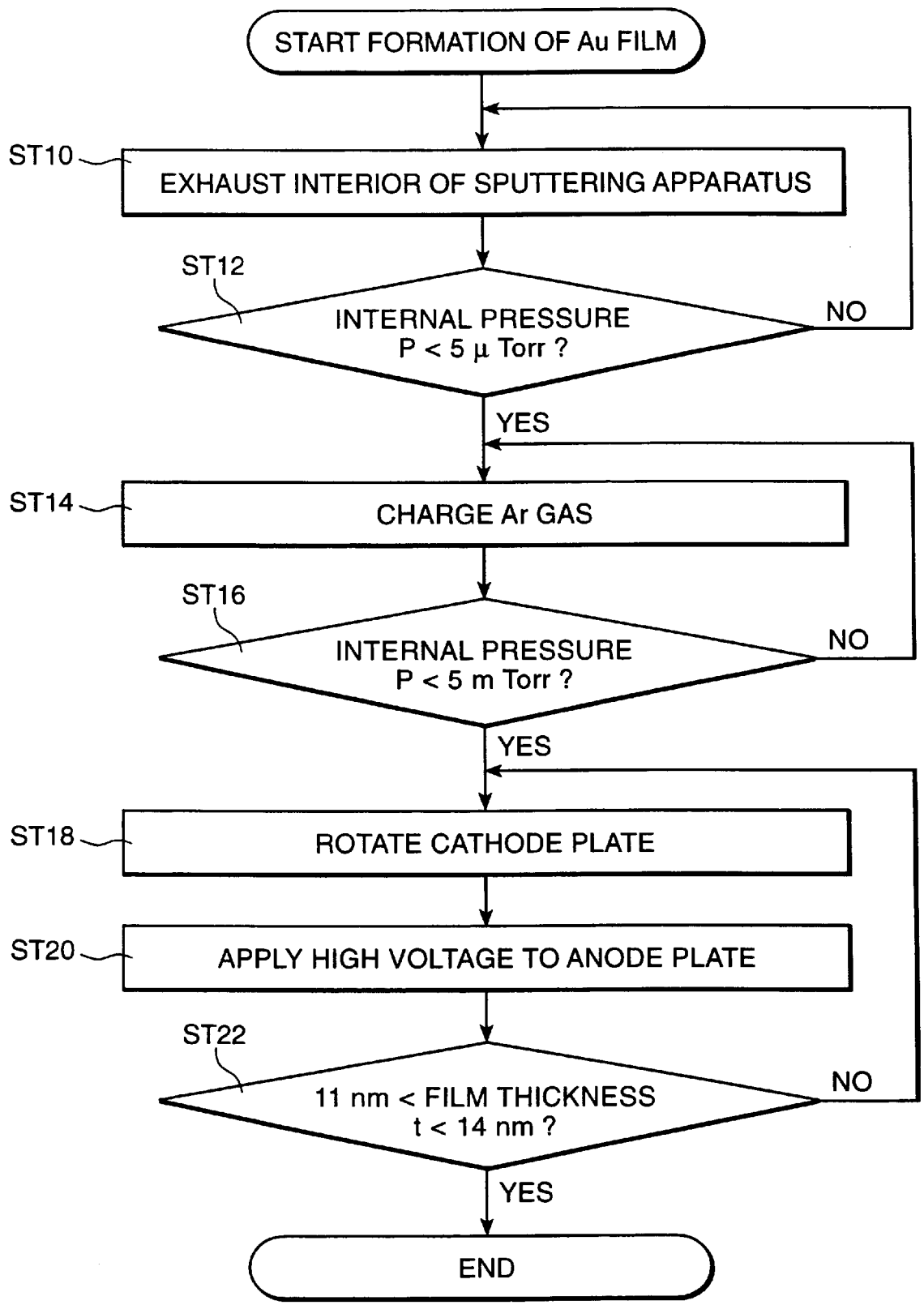
FIG. 4 is a flow chart for explaining a procedure for forming first information recording layer 10 (thin metal film) for the double-layered optical disk by using the apparatus in FIG. 3.

FIG. 4 is a flow chart for explaining a procedure for forming first information recording layer 100 for multi-substrate double-layered optical disk OD by using the apparatus shown FIG. 3. A program corresponding to this procedure is executed by the CPU incorporated in sputtering controller 120 shown in FIG. 3.

Sputtering controller 120 drives exhausting pump 114 to evacuate vacuum vessel 100 to, for example, 5 µTorr or less while monitoring the internal pressure of vacuum vessel 100 by using internal pressure sensor 108 (step ST10; NO in step ST12). Thereafter, sputtering controller 120 controls control valve 118 to charge argon gas into vacuum vessel 100 at 5 mTorr or less while monitoring the internal pressure in vacuum vessel 100 by using internal pressure sensor 108 (step ST14; NO in step ST16).

Sputtering of gold is started by using the low-pressure argon gas charged in this manner as a sputtering gas.

Sputtering controller 120 causes motor 110 to rotate cathode plate 102 on which substrate 30 is mounted (step ST18). Meanwhile, sputtering controller 120 applies a predetermined voltage to the sputtering source (gold in this case) for a predetermined period of time (step ST20). With this process, laser reflecting layer 10 having a predetermined thickness is formed (YES in step ST22).

In the above embodiment, substrate 30 is rotated in the sputtering process. If, however, variations in the thickness of thin film 10 are limited within a predetermined value, substrate 30 need not be rotated in the sputtering process.

The above embodiment exemplifies an up-sputtering method in which substrate 30 is placed above a target material. However, a side-sputtering method in which substrate 30 is placed on the side of a target material may be used.

Experimental Example

The internal pressure of vacuum vessel 100 was decreased to 1 Torr by exhausting pump 114. Thereafter, argon gas was charged into vacuum vessel 100 to set the argon gas pressure to a predetermined value. The set argon gas pressure, the state of thin metal film 10 formed by sputtering, and the argon content had the following relationship:

| Argon Gas Pressure (mTorr) | State of Thin Metal Film | Argon Content (at %) |
|---|---|---|
| 9 | island | 5 |
| 6 | island | 5 |
| 7 | island | 4 |
| 6 | almost uniform | 3 |
| 5 | uniform | 2 |
| 4 | uniform | 2 |
| 3 | uniform | 1 |
| 2 | uniform | 1 |
| 1 | uniform | 1 |

When the argon gas pressure is set to 5 mTorr or less, the argon content of thin metal film 10 becomes 2 at % or less. As a result, a uniform thin film (thickness: 11 nm to 14 nm) is obtained.

Figure 5:
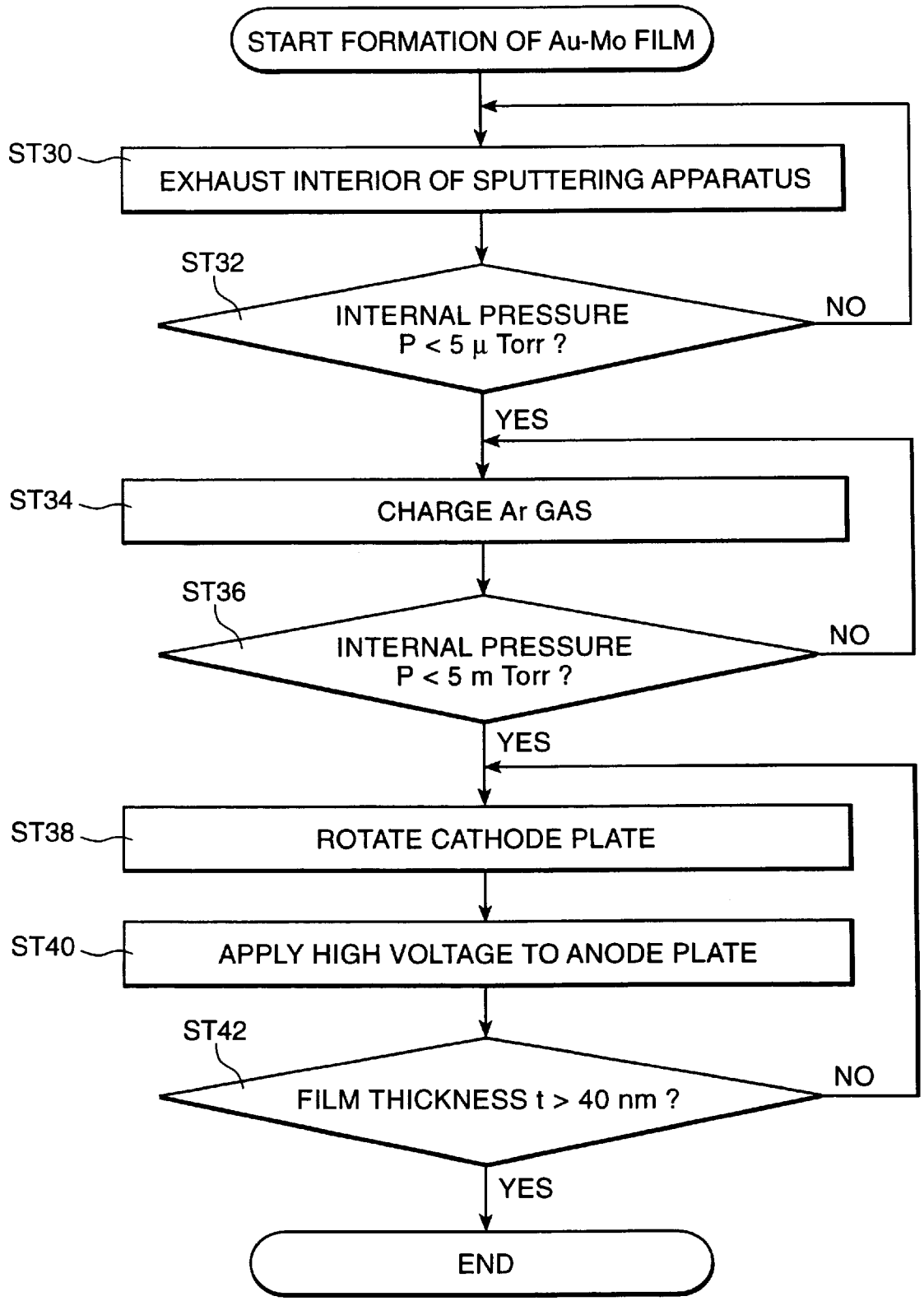
FIG. 5 is a flow chart for explaining a procedure for forming second information recording layer 20 (thin aluminum-molybdenum alloy film) for the double-layered optical disk by using the apparatus in FIG. 3.

FIG. 5 is a flow chart for explaining a procedure for forming a second information recording layer 20 for multi-substrate double-layered optical disk OD by using the apparatus shown in FIG. 3. A program corresponding to this procedure can also be executed by the CPU of sputtering controller 120 in FIG. 3.

Sputtering controller 120 drives exhausting pump 114 to evacuate vacuum vessel 100 to 5 µTorr while monitoring the internal pressure of vacuum vessel 100 by using internal pressure sensor 108 (step ST30; NO in step ST32). Thereafter, sputtering controller 120 controls control valve 118 to charge argon gas into vacuum vessel 100 at 5 mTorr or less while monitoring the internal pressure of vacuum vessel 100 by using internal pressure sensor 108 (step ST34; NO in step ST16).

Sputtering of gold is started by using the low-pressure argon gas charged in this manner as a sputtering gas.

Sputtering controller 120 causes motor 110 to rotate cathode plate 102 on which substrate 40 is mounted (step ST38). Meanwhile, sputtering controller 120 applies a predetermined power to the respective sputtering sources (aluminum and molybdenum in this case) in the layer formation order (aluminum first and then molybdenum in this case) for a predetermined period of time (step ST40). As a result, laser reflecting layer 20 having a predetermined thickness is formed (YES in step ST42).

In the above embodiment, substrate 40 is rotated in the sputtering process. If, however, variations in the thickness of thin film 20 are limited within a predetermined value, substrate 40 need not be rotated in the sputtering process.

The above embodiment exemplifies the up sputtering method in which substrate 40 is placed above a target material. However, the side sputtering method in which substrate 40 is placed on the side of a target material may be used.

The above procedure shown in FIG. 5 is associated with the sputtering method using the apparatus in FIG. 3. However, layer 20 can also be formed by using the vacuum deposition method.

FIGS. 6A to 6D explain steps (a) to (d) of completing multi-substrate double-layered optical disk OD by pasting substrates 30 and 40 in a semi-disk state, which have been obtained through the procedures shown in FIGS. 4 and 5.

Figure 7A:
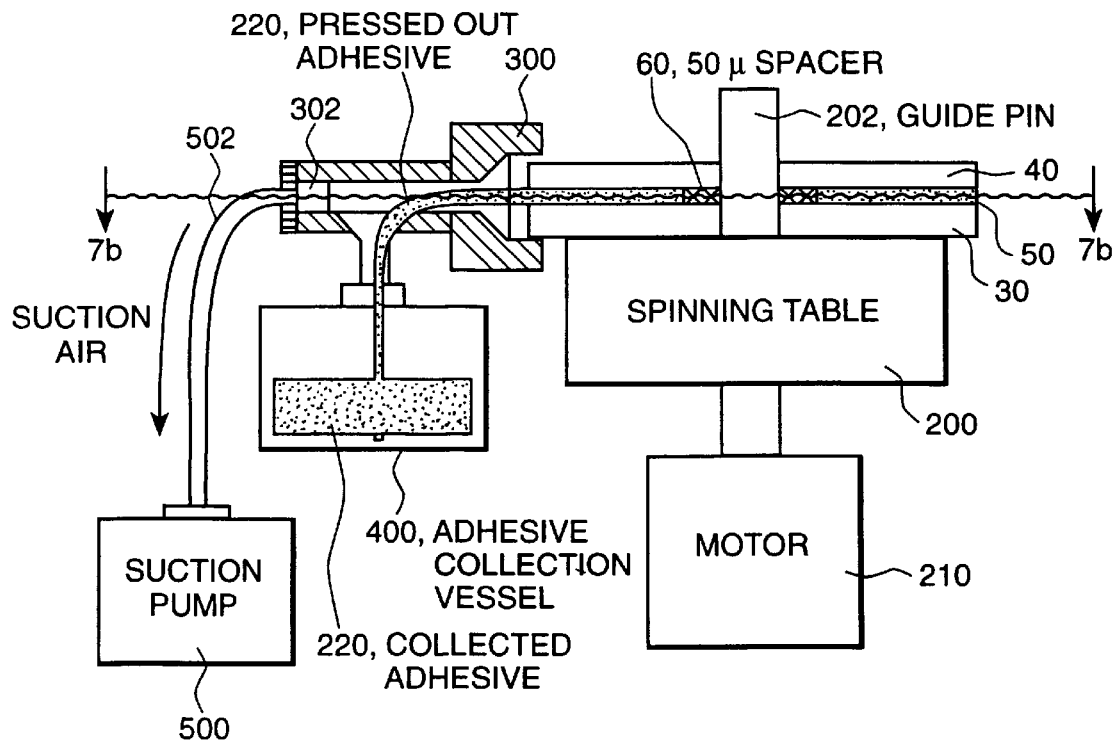
FIGS. 7A and 7B are views showing the structure of an apparatus for collecting an excessive adhesive produced during a pasting process for substrates 30 and 40 in the semi-disk state in the manufacturing process for a multi-substrate disk in 6A to 6D.
Figure 7B:
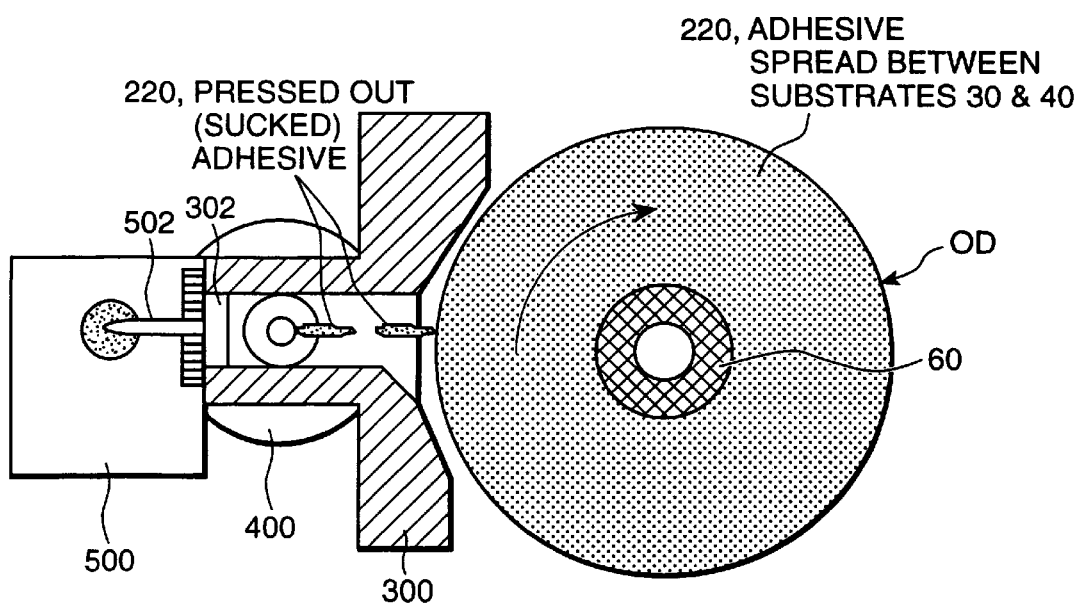

FIGS. 7A and 7B show the arrangement of an apparatus for collecting an excessive adhesive in the manufacturing process for multi-substrate disk OD (FIG. 7B is a partial sectional view taken along a line 7b—7b in FIG. 7A).

Figure 8:
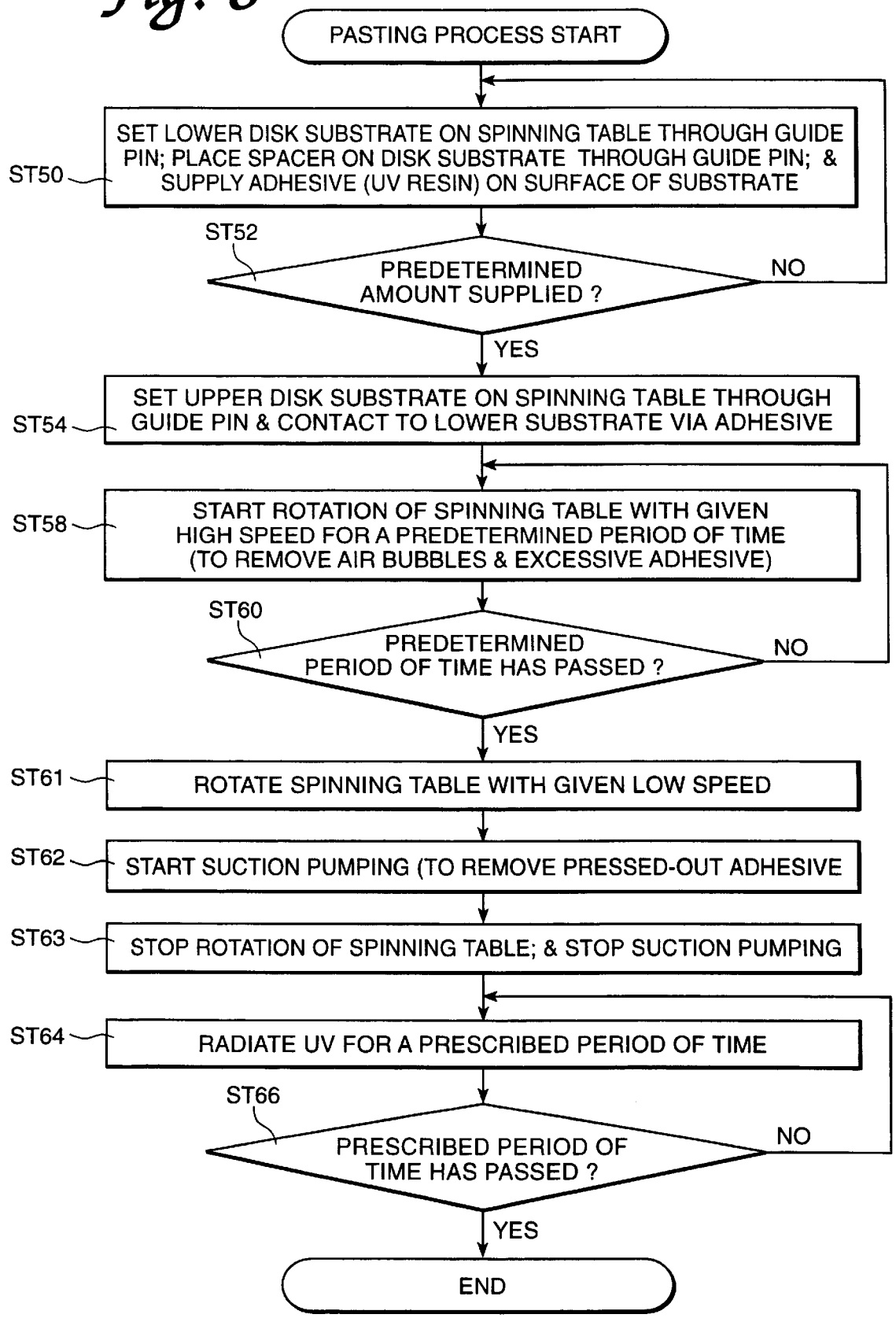
FIG. 8 is a flow chart for explaining a procedure corresponding to the manufacturing process for a multi-substrate disk in FIGS. 6A to 6D.

FIG. 8 is a flow chart for explaining a procedure corresponding to the multi-substrate disk manufacturing process shown in FIGS. 6A to 6D. This procedure will be sequentially described below.

Figure 6A:
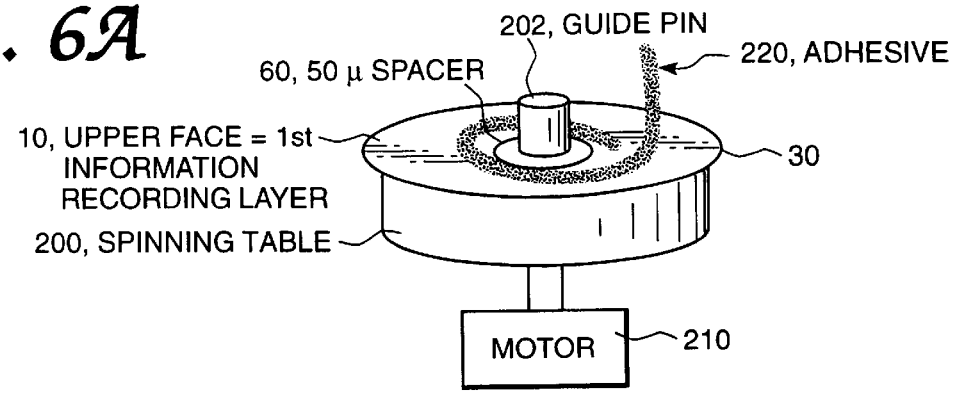
FIGS. 6A to 6D are views for explaining a manufacturing process of completing a double-layered optical disk by pasting substrates 30 and 40 in a semi-disk state, which have been obtained through the procedures in FIGS. 4 and 5.

Referring to FIG. 6A, first of all, polycarbonate substrate (one substrate of multi-substrate optical disk OD) 30 is fitted on guide pin 202 of spinning table 200 such that first information recording layer (thin metal film) 10 faces up. Thereafter, 50-µm thick film spacer 60 is fitted on guide pin 202.

After substrate 30 comes in tight contact with spinning table 200, and spacer 60 comes in tight contact with substrate 30, a proper amount of low-viscosity ultraviolet curing adhesive 220 is applied (or dropped) (step ST50 in FIG. 8).

As adhesive 220, for example, an ultraviolet (UV) curing, thermosetting, or anaerobic curing adhesive having a viscosity of about 300 to 800 mPa·s (millipascal second) is suitably used.

Figure 6B:
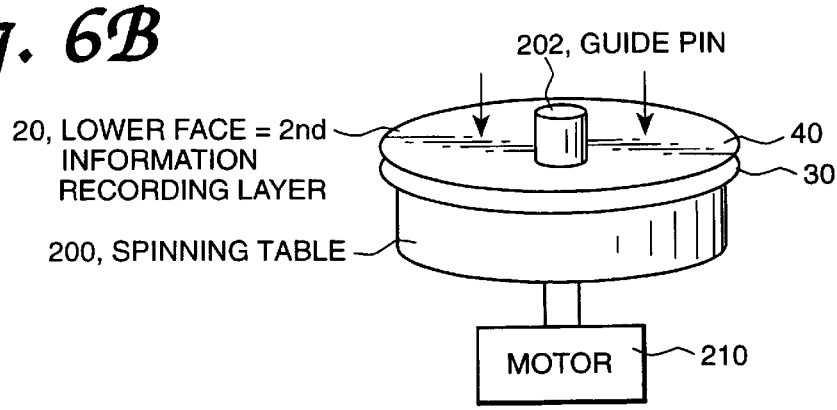

Referring to FIG. 6B, after the proper amount of adhesive 220 is applied or dropped (YES in step ST52), polycarbonate substrate (the other substrate of multi-substrate optical disk OD) 40 is fitted on guide pin 202 such that second information recording layer (thin aluminum-molybdenum alloy film) 20 faces down (step ST54). Substrate 40 comes in tight contact with substrate 30 to spread adhesive 220 applied onto substrate 30. (After substrate 40 is brought into tight contact with substrate 30, no external force is specially applied to press substrate 40 against substrate 30).

The possibility that air bubbles (fine particles or dust) enter the thin film (serving as adhesive layer 50 afterward) of adhesive 220 spread between substrates 30 and 40 is maximized at this time. The space between substrates 30 and 40 is larger than the thickness (50 μm) of spacer 60, and there is a possibility that air bubbles, dust, and the like may be sandwiched between the substrates together with excessive adhesive 220.

Figure 6C:
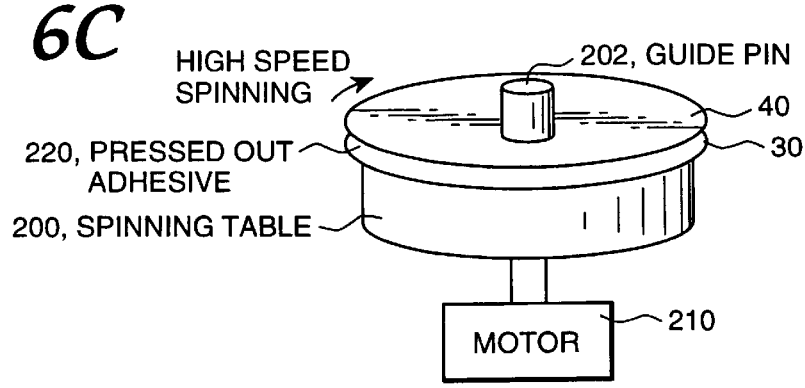

Referring to FIG. 6C, after substrate 40 is brought into tight contact with substrate 30, spinning table 200 is rotated at a given high speed (about 100 to 2,000 rpm; need not always be rotated at a constant speed but may be rotated at variable speed) (step ST58). As a result, excessive adhesive 220 between substrates 30 and 40 is expelled, together with air bubbles, dust, and the like, with a centrifugal force.

Referring to FIGS. 7A and 7B, part of expelled excessive adhesive 220 including the air bubbles, dust, and the like is blocked by adhesive scattering prevention fence 300 (during execution of step ST58). After this high-speed rotating operation is continued for a predetermined period of time (about 10 seconds, which may change depending on the situation) (YES in step ST60), the rotational speed of spinning table 200 is changed to a given low speed (e.g., about 6 rpm) (step ST61). At this time, uniform adhesive layer 50 having a thickness of about 50 μm and no air bubbles is left between substrates 30 and 40. At this time, the total thickness of substrates 30 and 40 is almost 1.2 mm.

After excessive adhesive 220 is expelled by the high-speed rotating operation, a small amount of non-cured adhesive 220 adheres to the outer peripheral portion of multi-substrate disk OD (30+40). In order to remove this pressed-out adhesive 220, suction pump 500 is started (step ST62). Spinning table 200 is rotated at a given low speed (about 6 rpm) while suction pump 500 operates. With this operation, excessive adhesive 220 adhering to the outer periphery of multi-substrate disk OD is collected to the pump 500 side.

When collection of excessive adhesive 220 adhering to the outer periphery of multi-substrate disk OD is completed, the rotation of spinning table 200 is stopped, and suction pump 500 is stopped (step ST63).

Note that excessive adhesive 220 adhering to the outer periphery of multi-substrate disk OD is collected into adhesive collection vessel 400 with a suction air flow produced through air tube 502 extending from pump 500. In this case, since adhesive 220 flowing to the air tube 502 side is blocked by adhesive passage blocking filter 302, no adhesive 220 flows into pump 500. Adhesive passage blocking filter 302 needs to be periodically replaced or cleaned.

Figure 6D:
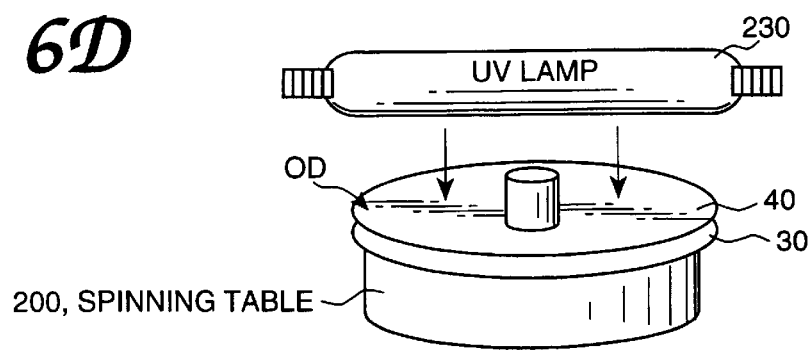

Referring to FIG. 6D, multi-substrate optical disk OD, on which uniform adhesive layer 50 having no air bubbles is left, is irradiated with ultraviolet light emitted from UV lamp 230 (step ST64). After ultraviolet light is radiated for a predetermined period of time (YES in step ST66), adhesive 220 serving as layer 50 is cured up to the practical strength. With this process, substrates 30 and 40 are completely integrated, and hence multi-substrate optical disk OD having a two-layered structure is completed.

Note that the rotational speed and high-speed rotation holding interval of motor 210 in steps ST50 to ST60 in FIG. 8 can be selectively determined by an experiment using a plurality of samples such that no air bubbles are left in adhesive layer 50, and its thickness falls within the range of 50±5 μm.

The diameter of spinning table 200 is set to be slightly smaller than the outer diameter (120 mm or 80 mm in general) of optical disk OD to be manufactured. Making the diameter of spinning table 200 smaller than the outer diameter of optical disk OD prevents adhesive 220 leaking from the outer periphery of multi-substrate disk OD from flowing between disk OD and the table surface of spinning table 200.

More specifically, the diameter of spinning table 200 may be set to be about 115 to 117 mm for multi-substrate optical disk having a diameter of 120 mm (5-inch disk) OD, and may be set to be about 75 to 77 mm for multi-substrate optical disk having a diameter of 80 mm (3.5-inch disk) OD. Similarly, for a 2.5-inch disk (diameter: 63 mm), a diameter corresponding to the size of the disk is selected for the spinning table.

Figure 9:
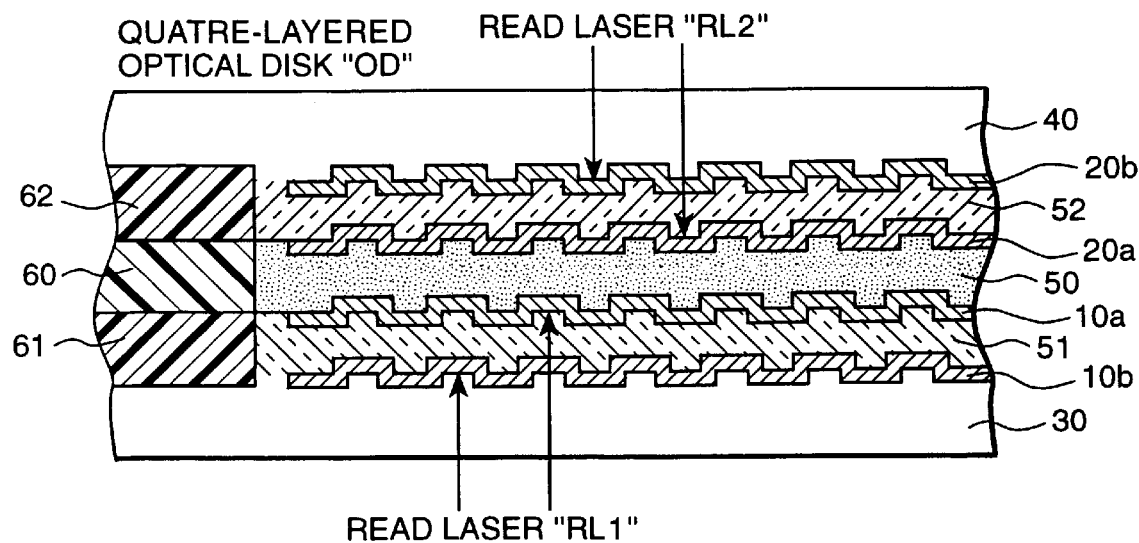
FIG. 9 is a partial deformed sectional view showing a modification of the embodiment in FIG. 2, and more specifically, multi-substrate optical disk OD constituted by four information recording layers.

FIG. 9 is a partial deformed sectional view showing a modification of the single-sided read type multi-substrate double-layered optical disk in FIG. 2, and more specifically, multi-substrate optical disk OD having four information recording layers.

In this case, information recording layer 10a is formed on substrate 30, on which information recording layer 10b is formed, through first transparent layer 51 (double-layered structure), and information recording layer 20a is formed on substrate 40, on which information recording layer 20b is formed, through second transparent layer 52 (double-layered structure). One surface of layer 10a on substrate 30 is bonded to one surface of layer 20a on substrate 40 through adhesive layer 50 (adhesive 220).

First spacer 61 which can be used as a label is placed at the disk central portion between layers 10a and 10b, and second spacer 62 which can be used as a label is placed at the disk central portion between layers 20a and 20b.

In the modification shown in FIG. 9, information on information recording layers 10a and 10b is read from below by using read laser RL1, and information on information recording layers 20a and 20b is read from above by using read laser RL2.

Figure 10:
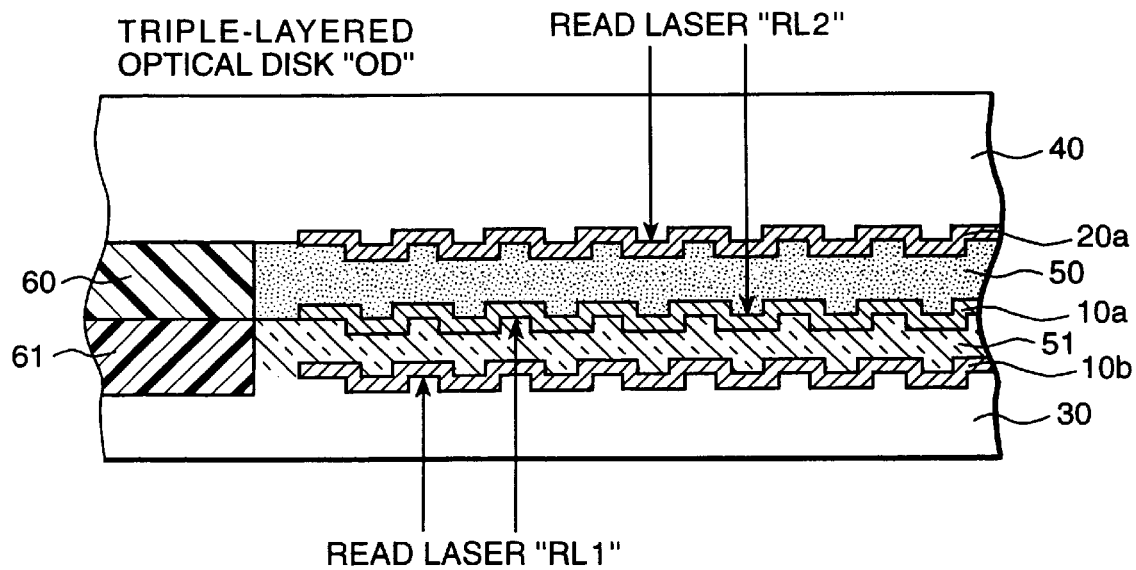
FIG. 10 is a partial deformed sectional view showing another modification of the embodiment in FIG. 2, and more specifically, multi-substrate optical disk OD constituted by three information recording layers.

FIG. 10 is a partial deformed sectional view showing another modification of the single-sided read type multi-substrate double-layered disk shown in FIG. 2, and more specifically, a multi-substrate optical disk OD having three information recording layers.

In this case, information recording layer 10a is formed on substrate 30, on which information recording layer 10b is formed, through first transparent layer 51 (double-layered structure), and information recording layer 20a is formed on substrate 40 (single-layered structure). One surface of layer 10a on substrate 30 is bonded to one surface of layer 20a on substrate 40 through adhesive layer 50 (adhesive 220).

First spacer 61 which can be used as a label is placed at the disk central portion between layers 10a and 10b.

In the modification shown in FIG. 10, information on information recording layers 10a and 10b can be read from below by using read laser RL1, and information on information recording layers 20a and 20b can be read from above by using read laser RL2.

In the modification shown in FIG. 10, when information is to be read from both information recording layers 10a and 10b by using upper-side read laser RL2, layer 20a may be made of a thin metal film having a thickness of about 13 nm instead of a thick aluminum-based metal film.

Figure 11:
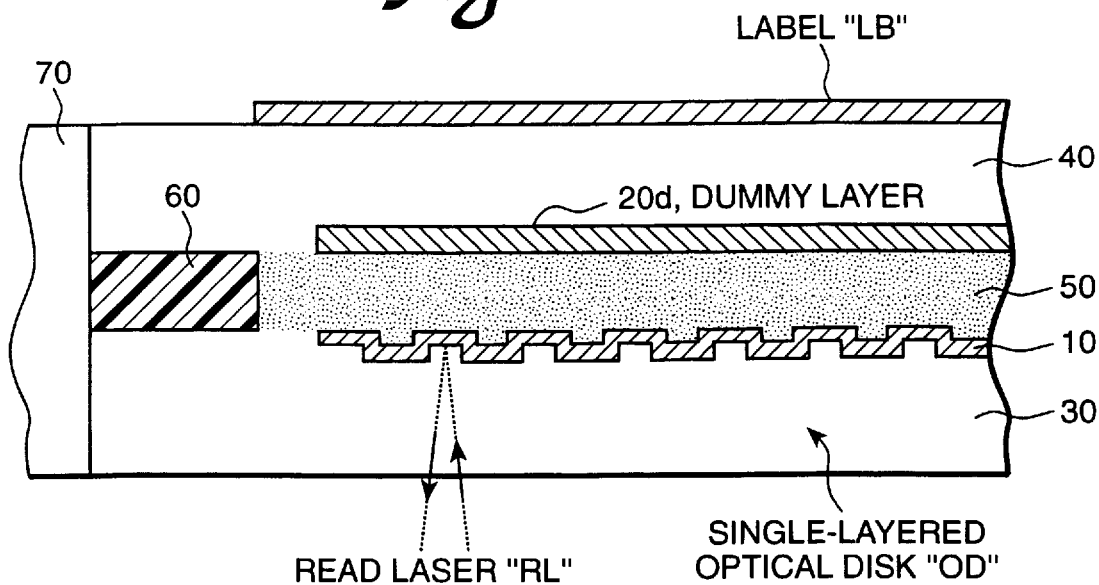
FIG. 11 is a partial deformed sectional view showing still another modification of the embodiment in FIG. 2, and more specifically, multi-substrate optical disk OD constituted by one information recording layer.

FIG. 11 is a partial deformed sectional view showing still another modification of the single-sided read type multi-substrate double-layered disk shown in FIG. 2, and more particularly, a multi-substrate optical disk OD having one information recording layer.

In the modification shown in FIG. 11, information recording layer 20 in FIG. 2 is replaced with dummy layer 20d. When the total amount of data to be stored in disk OD is equal to or smaller than the capacity of information recording layer 10, the modification shown in FIG. 11 can be used (information recording layer 10 can ensure a storage capacity of about 5 GB along). Dummy layer 20d can be made of a thin aluminum-based metal film painted with a predetermined information pattern having no substantial contents (in this case, "having no substantial contents" includes not only a case wherein no data is recorded on the recording surface but also a case wherein monotonous data such as data "0"s or "1"s are written in the entire recording surface).

Figure 12:
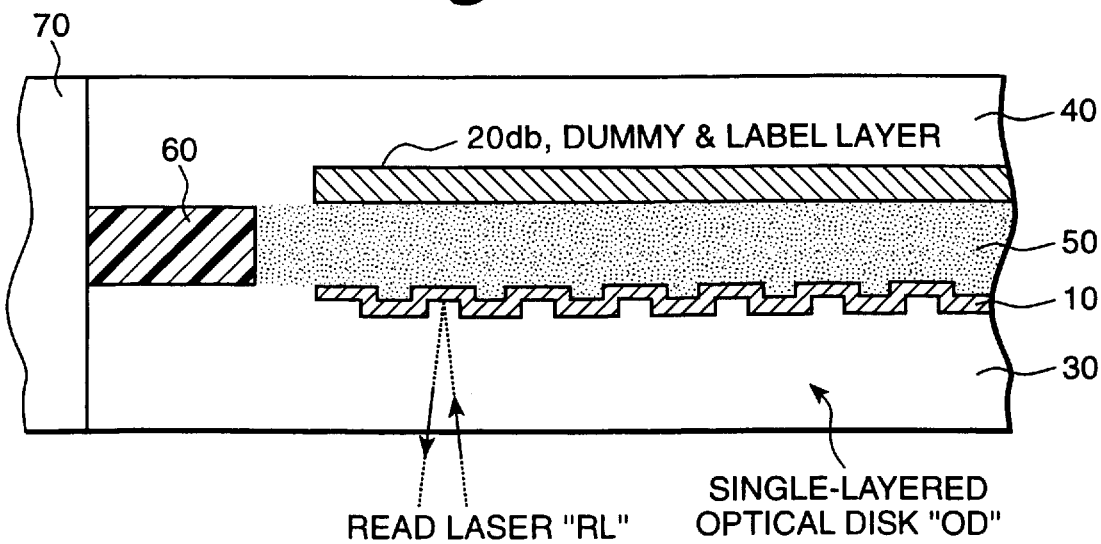
FIG. 12 is a partial deformed sectional view showing still another modification of the embodiment in FIG. 2, and more specifically, another example of the multi-substrate optical disk OD constituted by one information recording layer.

FIG. 12 is a partial deformed sectional view showing a structure obtained by modifying the structure in FIG. 11, and more specifically, multi-substrate optical disk OD having one information recording layer.

In the embodiment shown in FIG. 12, information recording layer 20 in FIG. 2 is replaced with dummy layer 20db having a label pattern. If this optical disk OD can be specified as a multi-substrate single-layered disk when the information on information recording layer 10 is partially read, a reproducing apparatus for disk OD can be initialized so as not to access the information on dummy/label layer 20db. In this case, since dummy/label layer 20db need not reflect read laser RL, the degree of freedom in selecting a material for dummy/label layer 20db increases. More specifically, a polycarbonate film on which a label pattern is printed can be used as dummy/label layer 20db.

In each of the modifications shown in FIGS. 11 and 12, the thickness of dummy layer 20d or 20db need not be controlled specifically, but the total thickness of substrate 40 including the dummy layer 20d or 20db is controlled to a predetermined value (0.6 mm).

In single-sided read type multi-substrate double-layered disk OD in FIG. 2, since a read operation from second substrate 40 side is not performed, label LB can be placed on a surface of substrate 40. According to the structure shown in FIG. 9 or 10, however, since information is read from both the substrate 30 side and the substrate 40 side, large-area label LB like the one shown in FIG. 2 cannot be placed on disk OD.

In this case, since polycarbonate substrates 30 and 40 are transparent, characters, patterns, and the like associated with the information recorded on the disk are printed on spacer 60 sandwiched between substrates 30 and 40 in advance. With this structure, the spacer 60 portion in the center of the disk can be used as a disk label although the amount of written visual information is limited.

In each of the embodiment and modifications shown in FIGS. 2, 9, and 10, the total thickness of multi-substrate multi-layered optical disk OD is controlled to 1.2 mm. For this reason, the thickness (slightly less than 0.6 mm) of substrate 30 itself in FIG. 10 or 9, which has transparent layer 51, is smaller than the thickness (about 0.6 mm) of substrate 30 itself in FIG. 2, which does not have layer 51, by the thickness (about 50 $\mu$m) of layer 51. Similarly, the thickness (slightly less than 0.6 mm) of substrate 40 itself in FIG. 9, which has transparent layer 52, is smaller than the thickness (about 0.6 mm) of substrate 40 itself in FIG. 2 or 10, which does not have layer 52, by the thickness (about 50 $\mu$m) of layer 52. In any case, the thickness (standard value: 0.6 mm) of each of substrates 30 and 40 may be properly changed in accordance with the contents of the embodiment.

In this embodiment, a thin aluminum-molybdenum alloy film is used as second information recording layer 20. However, the present invention is not limited to this. As the second information recording layer 20, an alloy layer consisting of aluminum and a refractory metal (tungsten, tantalum, nickel, cobalt, platinum, chromium, titanium, or the like), other than a pure aluminum layer, a gold layer, and a molybdenum layer, which has a high melting point, a high strength, and a high oxidation resistance can be used depending on the embodiment of the present invention. However, materials for the first information recording layer 10 are limited to those (a gold alloy, copper, silver, brass, a copper-zinc alloy, a copper-aluminum alloy, and the like) exhibiting almost the same laser reflectance and transmittance with respect to a laser having a specific wavelength when formed into thin films as those of gold.

In the above description, the thickness of ultraviolet curing resin layer (adhesive layer) 50 is 50 $\mu$m. If, however, multi-substrate disk OD shown in FIG. 1 is a read-only disk (DVD-ROM), a thickness for this disk may be selected from the range of 40 $\mu$m to 70 $\mu$m. If multi-substrate disk OD shown in FIG. 1 is a RAM disk (DVD-RAM), adhesive layer 50 is preferably thinner than that of the read-only disk. In this case, a thickness for adhesive layer 50 may be selected from the range of 20 $\mu$m to 40 $\mu$m.

In addition, a 5-inch type disk (diameter: 120 mm) and a 3.5-inch type disk (diameter: 80 mm) have been described as optical disks OD. However, the present invention can be applied to a 2.5-inch type disk (diameter: 63 mm) and multi-substrate optical disks having other sizes. In this case, the optimal adhesive layer thickness (i.e., the thickness of spacer 60) may be determined in accordance with the disk size, the disk material, the disk type (ROM or RAM), the type of adhesive, and other conditions.

In the above description, a film ring geometrically similar to a disk is used as spacer 60. However, the shape of spacer 60 is not limited to the shape of a ring. It suffices if spacer 60 is positioned when guide pin 202 is inserted into the hole of spacer 60. Therefore, the hole of spacer 60 may be a polygon having straight lines more than those of a triangular (the diameter of the inscribed circle is set to be slightly larger than 15 mm). Similarly, the outer shape of spacer 60 may be an arbitrary polygon as long as the diameter of the circumscribed circle falls outside the region of the information recording layer in FIG. 1. For example, a polygonal film (having a thickness of, e.g., 50 $\mu$m) having a hexagonal outer shape circumscribing a circle having a diameter of 33 mm and an octagonal hole inscribing a circle having a diameter of 15 mm may be used as spacer 60. Assume disk recorded information (characters, symbols, or pictures) is to be printed on spacer 60. In this case, the commercial value (mainly on design) may be increased by not limiting spacer 60 to an annular shape.

Figure 13:
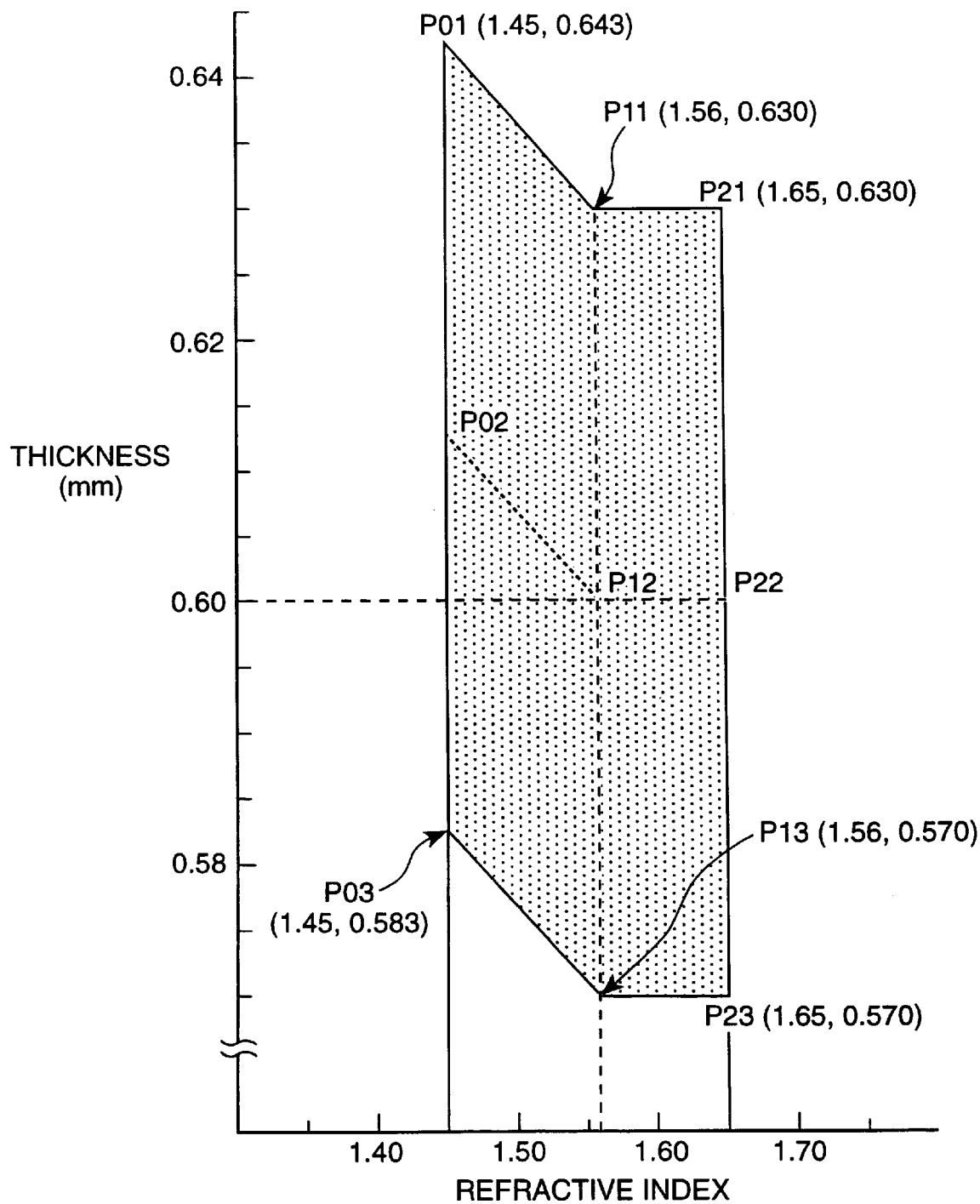
FIG. 13 is a graph showing how the allowable range of thickness (ordinate) of a substrate (30 or 40) used for a pasting process changes in accordance with the refractive index (abscissa) of a substrate material when coherent light having a wavelength of 650 nm is used for a read operation, and a pair of substrates for a single substrate/single recording layer structure like the one shown in FIG. 2 are used.

FIG. 13 is a graph showing how the allowable range of thickness (ordinate) of a substrate (30 or 40) used for a pasting process changes in accordance with the refractive index (abscissa) of a substrate material when coherent light having a wavelength of 650 nm is used for a read operation, and a pair of substrates (30 and 40) for a single substrate/ single recording layer structure like the one shown in FIG. 2 are used.

According to this graph, when the refractive index of a substrate is 1.45, the thickness of the substrate is controlled to fall within the range of 0.643 (point P01) as the upper limit to 0.583 (point P03) as the lower limit (the central value is 0.615 mm at point P02). If, for example, the refractive index of a polycarbonate substrate is 1.56, the thickness of the substrate is controlled to fall within the range of 0.630 (point P21) as the upper limit to 0.570 (point P13) as the lower limit (the central value is 0.600 mm at point P12). If the refractive index of the substrate is 1.65, the thickness of the substrate is controlled to fall within the range of 0.630 (point P21) as the upper limit to 0.570 (point P23) as the lower limit (the central value is 0.600 mm at point P02).

The embodiment of the present invention uses a transparent substrate (30 or 40) consisting of polycarbonate or the like and having a thickness that falls within the range defined by points P01 to P23.

Figure 14:
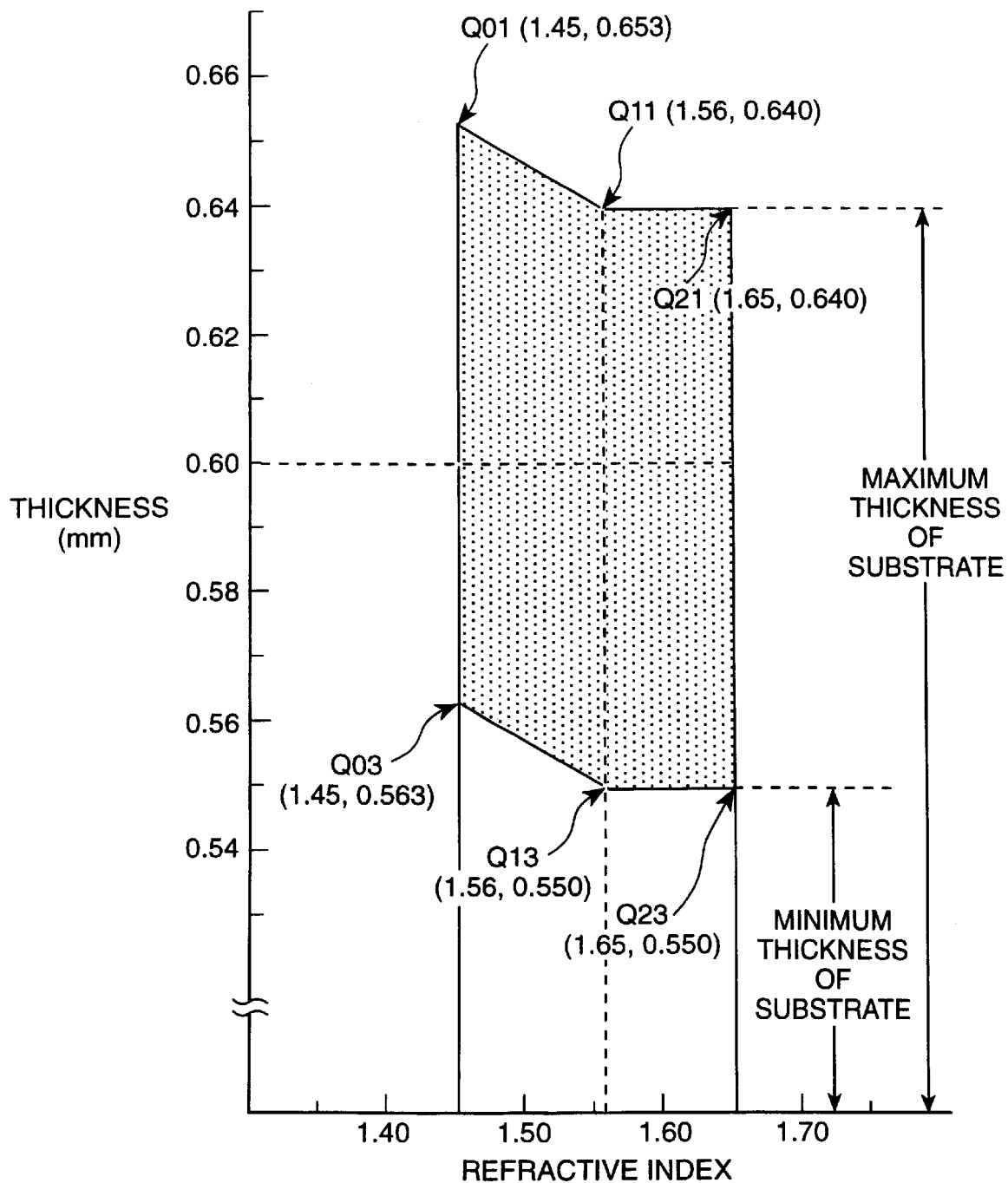
FIG. 14 is a graph showing how the allowable range of thickness (ordinate) of a substrate (30 or 40) used for a pasting process changes in accordance with the refractive index (abscissa) of a substrate material when coherent light having a wavelength of 650 nm is used for a read operation, and a pair of substrates for a single substrate/double recording layer structure like the one shown in FIG. 9 are used.

FIG. 14 is a graph showing how the allowable range of thickness (ordinate) of a substrate (30 or 40) used for a pasting process changes in accordance with the refractive index (abscissa) of a substrate material when coherent light having a wavelength of 650 nm is used for a read operation, and a pair of substrates (30 and 40) for a single substrate/ double recording layer structure like the one shown in FIG. 9 are used.

According to this graph, when the refractive index of a substrate is 1.45, the thickness of the substrate is controlled to fall within the range of 0.653 (point Q01) as the upper limit to 0.563 (point Q03) as the lower limit. If the refractive index of the substrate is 1.56, the thickness of the substrate is controlled to fall within the range of 0.640 (point Q11) as the upper limit to 0.550 (point Q13) as the lower limit (the central value is about 0.595 mm). If the refractive index of the substrate is 1.65, the thickness of the substrate is controlled to fall within the range of 0.640 (point Q21) as the upper limit to 0.550 (point Q23) as the lower limit.

The embodiment of the present invention uses a transparent substrate (30 or 40) consisting of polycarbonate or the like and having a thickness that falls within the range defined by points Q01 to Q23.

As shown in FIG. 9, when two information recording layers (10a and 10b or 20a and 20b) are to be formed per substrate, since a resin layer (51 or 52) is formed between the information recording layers, a relatively small substrate thickness is selected (the central thickness in FIG. 13 is 0.600 mm, whereas the central thickness in FIG. 14 is 0.595 mm) is selected in consideration of the thickness of this resin interlayer (51 or 52).

In the present invention, since spacer 60 having an adhesive layer thickness regulating function is placed between two substrates to be pasted, the following effects are obtained:

(1) Since two substrates 30 and 40 are rotated at a high speed, dust, air bubbles, and the like between the substrates are expelled, together with excessive adhesive 220, while the space between the substrates which is regulated by the thickness (50 $\mu$m) of spacer 60 is maintained. During this high-speed rotating operation, when excessive adhesive 220 is expelled from the space between substrates 30 and 40, the inner pressure between the two substrates decreases, and forces based on the ambient pressure (atmospheric pressure in general) are uniformly exerted on the entire surfaces of substrates 30 and 40 in a direction in which they are pressed against each other. At this time, the space between substrates 30 and 40 does not decrease below the thickness (50 $\mu$m) of spacer 60. As a result, the thickness of adhesive layer 50 made of adhesive 220 between two substrates 30 and 40 can be controlled to fall within a predetermined range (e.g., 50±5 $\mu$m) defined by the thickness of spacer 60.

(2) If spacer 60 is used as in the present invention, the adhesive layer between substrates 30 and 40 does not become excessively thin even if the two substrates are rotated at a high speed. For this reason, no upper limit needs to be imposed on the rotational speed. Therefore, air bubbles, dust, and the like left in adhesive layer 50 between two substrates 30 and 40 to be pasted together can be completely expelled, together with excessive adhesive 220, by rotating the two substrates at a sufficiently high speed. That is, adhesive layer 50 having almost no thickness irregularity can be obtained without accurately controlling the rotational speed for a high-speed rotating operation to a specific value. Multi-substrate disks for which dimensional accuracy is required in the direction of thickness after a pasting process can therefore be mass-produced with a high yield, and the manufacturing cost can be suppressed to almost the same cost as that for single-substrate disks.

(3) Since the thickness of adhesive layer 50 between first and second substrates 30 and 40 pasted together is made almost uniform at the thickness (about 50±5 $\mu$m) regulated by spacer 60, the rate of occurrence of read errors due to the thickness irregularity of adhesive layer 50 can be suppressed to the level at which no practical problems are posed.

(4) As spacer 60 having the adhesive layer thickness regulating function, a very thin label film on which characters, patterns, or the like are written may be used. This label film can be used as a disk label for a double-sided read type multi-substrate optical disk which allows no label to be placed on any information recording surface.

(5) Owing to spacer 60, a high-speed rotating process of completely removing air bubbles from adhesive layer 50 can be performed while the thickness of adhesive layer 50 is controlled within a predetermined range, thereby preventing a decrease in the strength of the adhesive layer due to air bubbles left in the adhesive layer. This prevents the disk substrates pasted together from peeling from each other due to the impact of falling or the like.

(6) When only one of the two substrate (30 and 40) has an information recording layer (10), a dummy layer (20d) corresponding to the information recording layer (10) is formed on the other substrate. When similar layers (10 and 20d) are respectively formed on one substrate (30) and the other substrate (40), and the substrates are pasted together with the layers opposing each other, the following effects can be obtained. Since physical distortions of the two substrates with environmental changes or with changes in quality over time occur symmetrically in almost the same amount, the distortions are canceled out by the pasting process. For this reason, peeling or warping of the substrates pasted together does not easily occur, and hence a multi-substrate information recording medium (multi-substrate optical disk OD) which is physically stable with respect to environmental changes or changes in quality over time can be obtained.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A multi-substrate disk comprising:
   a first disk-shaped substrate having a first information recording layer formed thereon, said first substrate having a predetermined outer diameter, a predetermined inner diameter, and a thickness of about 0.6 mm;
   a second disk-shaped substrate, said second substrate having the predetermined outer diameter, the predetermined inner diameter, and a thickness of about 0.6 mm; and
   an intermediate layer provided on said first information recording layer, and having a prescribed thickness;
   a second recording layer formed on said intermediate layer so that said intermediate layer is between said first and second recording layers;
   wherein a refractive index of said first substrate with respect to a sum of the thickness of said first substrate and intermediate layer is selected from the following sets of parameters:
   refractive index=1.45 with the sum of the thickness of 0.653 mm;
   refractive index=1.56 with the sum of the thickness of 0.640 mm;
   refractive index=1.65 with the sum of the thickness of 0.640 mm;
   refractive index=1.65 with the sum of the thickness of 0.550 mm;
   refractive index=1.56 with the sum of the thickness of 0.550 mm; and
   refractive index=1.45 with the sum of the thickness of 0.563 mm.

2. The disk of claim 1, wherein a label is provided between the inner diameter and the outer diameter of the disk.

3. The disk of claim 1, wherein a thickness of the disk including the thickness of said first substrate, second substrate and intermediate layer is between 1.14 mm and 1.23 mm.

4. The disk of claim 1, wherein a maximum inertial moment of the disk is 0.040 g·m$^2$ when said predetermined outer diameter is substantially 12 cm.

5. The disk of claim 1, wherein a maximum inertial moment of the disk is 0.010 g·m$^2$ when said predetermined outer diameter is substantially 8 cm.

6. The disk of claim 1, wherein a maximum dynamic balance of the disk is 0.010 g·m when said predetermined outer diameter is substantially 12 cm.

7. The disk of claim 1, wherein a maximum dynamic balance of the disk is 0.0045 g·m when said predetermined outer diameter is substantially 8 cm.

* * * * *